Figure 1:
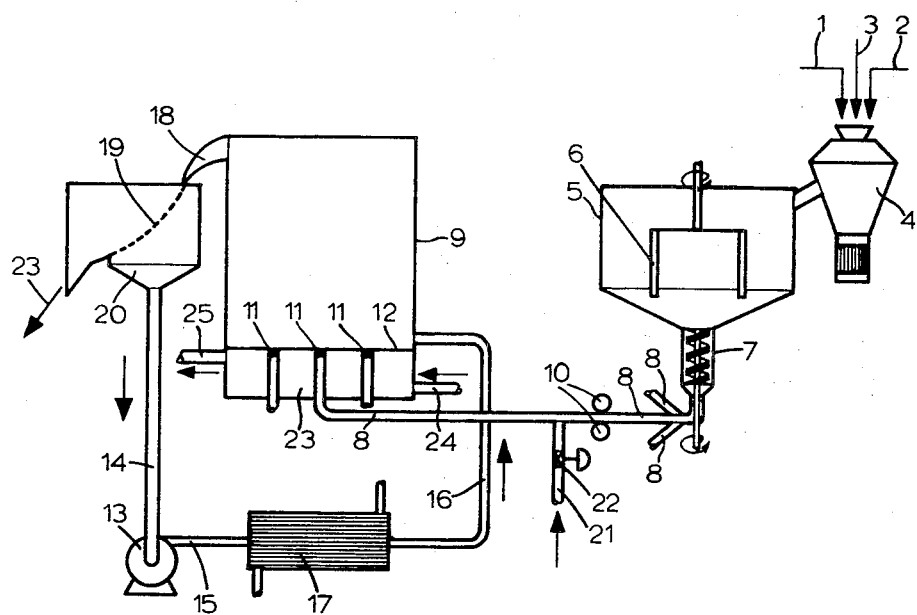

though the method used for the purpose is not known to be crucial for the invention, many existing techniques may be adapted, which generally depend on the nature of the carrier material and on that of the catalytically active component to be applied thereon.

United States Patent
Geus et al.

[15] 3,668,149
[45] June 6, 1972

[54] METHOD AND EQUIPMENT FOR THE PREPARATION OF CATALYTICALLY ACTIVE BODIES

[72] Inventors: John W. Geus, Geleen; Jan C. Lemmens, Beek, Limbug, both of Netherlands

[73] Assignee: Stamicarbon N.V., Heerlen, Netherlands

[22] Filed: Oct. 13, 1969

[21] Appl. No.: 865,821

[30] Foreign Application Priority Data

Oct. 11, 1968  Netherlands...........................68/4538
Nov. 18, 1968  Netherlands...........................68/6394

[52] U.S. Cl. ..................................................252/448
[51] Int. Cl. .................................................B01j 11/44
[58] Field of Search....................................252/448

[56] References Cited

UNITED STATES PATENTS 2,463,467  3/1949  Marisic.................................252/317
2,964,481  12/1960  Cramer..................................252/455
2,620,314  12/1952  Hoekstra...............................252/448
3,301,794  1/1967  Cramer..................................252/448
2,773,839  12/1956  Stover....................................252/448

*Primary Examiner*—Daniel E. Wyman
*Assistant Examiner*—Philip M. French
*Attorney*—Cushman, Darby & Cushman

[57] ABSTRACT

Porous catalyst bodies are produced from a thermally stable inorganic carrier material by introducing a suspension of the said carrier material into a liquid immiscible with the suspension medium and heated above the boiling point of the said medium. After evaporation of the suspension medium to an essential extent, the porous catalyst bodies formed are separated from the liquid and subsequently heated to an elevated temperature to improve the strength caracteristics thereof.

3 Claims, 1 Drawing Figure

METHOD AND EQUIPMENT FOR THE PREPARATION OF CATALYTICALLY ACTIVE BODIES

The present invention relates to a method and apparatus for making a catalyst body from a mass of a thermally stable inorganic material.

The known use of a catalyst in powder form for carrying out a chemical reaction has in certain instances presented some difficulties. For instance, in a situation where reactants flow through a bed of a catalyst in powder form the pressure drop can rise to an unacceptably high level, or channels are formed in the mass, or dust problems are encountered. Further, when a reaction is carried out in the liquid phase it is often difficult to separate the catalyst mass from the liquid. These problems can be essentially circumvented if catalytically active bodies of larger dimensions are used.

In U.S. Pat. application Ser. No. 721,051 now abandoned, there is described a method for the preparation of a catalyst mass by which catalytically active particles are applied to a finely divided thermally stable carrier material in such a way that said particles are isolated from each other. U.S. Pat. application Ser. No. 721,051 indicates that said catalytically active mass in powder form can be shaped into desired forms. However, it has been found that in the use of such catalytically active bodies described in said application reactants generally do not have as ready accessibility to the interior thereof, as would be desired, due principally to the relatively low macroporosity characteristics of the catalyst bodies. Further, the low transport capacity of the catalyst system sets a limit to the dimensions of the catalytically active catalyst particles. If the catalyst particles are too large, only a small part of them is used for the catalytic reaction, the remainder not being reached quickly enough by the reactants while the reaction products cannot be carried off quickly enough. Consequently, the dimensions of the catalyst bodies must be kept relatively small in order to provide the required catalytic activity. However, small dimensions of the catalytically active bodies, in turn, lead to a high pressure drop in the reactor and to high energy losses. When catalyst masses are compressed into bodies, the shape of said bodies, in which channels may or may not be provided, will usually be so selected as to offer good accessibility to the reactants, if necessary by providing channels. However, this desideratum cannot always be easily realized while retaining the required firmness or strength characteristics of the catalyst bodies.

While certain advances have been made in the field of producing catalyst bodies whereby some of the disadvantages enumerated above have been reduced, as for instance, where large porous carrier bodies are impregnated with a catalytically active material and thereafter subjected to a further thermal treatment, nonetheless, the distribution of the catalytically active material on or in said bodies is by no means uniform. Notably the active material agglomerates in the narrower pores so that it is very easily sintered during the subsequent thermal treatment. Accordingly, such methods are not entirely suitable wherein high temperatures are employed. Moreover, such a catalyst body cannot be easily loaded with a catalytically active material to as high a degree as is possible with catalyst bodies prepared by the method described in the abovementioned U.S. Pat. application Ser. No. 721,051 or the present invention.

The object of the present invention is to provide a simple method for producing firm and thermally stable catalyst bodies from a catalyst mass, consisting of a thermally stable carrier material loaded with one or more catalytically active compounds, exhibiting an ample range of variation of the macroporosity characteristics thereof and an extremely uniform distribution of the catalytically active compounds throughout the mass of the bodies. The method of this invention can be used with a large number of catalytically active compounds or elements and results in a high degree of loading of catalytically active material on the catalyst support. Additionally, the process according to the invention is also suited for the preparation of catalyst bodies which can be impregnated in accordance with conventional techniques.

In accordance with the method of the present invention, a suspension of a thermally stable carrier material, alone or in the presence of a catalytically active material, in insoluble form, is introduced into a liquid essentially immiscible with the suspension medium in predetermined small volumes ranging generally from about 0.1 to 10 ml and heated in said liquid at a temperature which is higher than the boiling point of the suspension medium at working pressure, whereupon the catalyst bodies are thus formed and are separated from the liquid. The resulting catalyst bodies are then dried if necessary, and subjected to a subsequent thermal treatment.

When the small volumes of suspension are introduced into the hot liquid, they are quickly heated through direct heat exchange therewith. The suspension medium evaporates rather suddenly and the vapor thus formed causes the mass to expand while forming many open pores. During this process the coherence between the carrier particles is not lost, however, so that relatively firm, highly porous sponge-like catalyst bodies with many open channels are formed from the suspension, which catalyst bodies can be easily removed from the heating liquid. Said catalyst bodies are after further drying, if necessary, subjected to a thermal treatment consisting at least in heating to such a temperature and for such a period of time that the carrier mass will harden. The temperature required to achieve this depends on the nature of the carrier material, the nature of the catalytically active particles, and the required strength (i.e. the hardness of wear resistance of the bodies). Generally, the temperature of the heat treating operation should be at least 600° C. and the treatment should be continued for a period of about 30 minutes to about 5 hours. Any heating liquid still adhering to the catalyst bodies will under these conditions be evaporated, decomposed or oxidized.

In the case of industrial application of the process according to the invention, the initial suspension will preferably be an aqueous suspension whereas the heating liquid is a hydrocarbon having a boiling point greater than 100 ° C. Suitable hydrocarbons include cheap liquids, such as mineral oils, anthracene oil, toluene or the like, or silicon oils, molten polyethylene etc.

Representative substances that can be used as the thermally stable carrier material include, for instance, naturally occurring clays such as kaolinite, mullite, bentonite and sepiolite. Further, various oxides such as silica, including silica sold under the trade name of "AEROSIL", aluminum oxide, titanium oxide, chromium oxide, magnesium oxide or glass or the like can also be used. If carrier particles highly loaded with a catalytically active material or carrier particles loaded with a catalytically active material but which are insufficiently coherent are employed, it has been found advantageous to add a small quantity of carrier material per se or any other of the above mentioned ceramic binders to the initial suspension of loaded material, e.g. 10 percent to 30 percent by weight based on the weight of the catalytically active material — containing carrier material.

The degree of porosity achieved in the catalyst bodies of the present invention depends essentially on the quantity of suspension medium contained in the suspension before heating. The more suspension medium employed the higher the porosity will be. If large amounts of suspension medium are required, it has been found advantageous to add to the suspension a viscosity-increasing or adhesive substance such as gelatine, a cellulose compound, e.g. carboxymethyl cellulose, or an acetate compound, e.g. methyl acetate. In this way it is possible to make catalytically active bodies with a volume of voids up to four times the volume of the carrier material. Generally, the ultimate porosity of the catalyst body can be selected and varied between 10 and 400 per cent of the volume of solid matter. It has been found that the viscosity of the aqueous suspension ranges generally between 50 and 200 poises at 20° C.

The catalyst bodies can be impregnated in any conventional manner with a catalytically active material, although, if desired and preferably an aqueous solution of a salt of the catalytically active material can be used as the suspension medium for the carrier material. In this case the salt remains in the granules of the carrier material during evaporation of the water in the heating liquid. Generally the catalytically active material is used in amounts sufficient such that the resulting catalyst body contains to about 25 weight percent catalytic active material based on the total weight of the catalyst. Subsequent impregnation is then no longer necessary, and the amount of catalytically active material contained in the catalyst bodies is particularly well defined. When desired, this procedure can be combined with the preparation of the catalyst bodies from a suspension of a thermostable carrier material previously provided with another catalytically active material. Representative catalytic materials include bismuth, chromium, cobalt, copper, iron, molybdenium, nickel, palladium, platinum, silver or tin.

The catalyst bodies obtained can be subjected to a conventional reduction process if an elemental metal is to be employed as the catalytically active component. In this connection it should be noted that the reduction process can be performed on the carrier material while it is still in the powder form, i.e. before actually making the catalyst bodies in accordance with the present invention. As an example of reduction conditions, the catalyst body containing a catalytic material can be contacted with hydrogen at a temperature ranging from 200° to 1,000° C. at a pressure from 1 to 10 atm for a period ranging from 1 to 72 hours to render the material active.

The process according to the invention can be carried out in apparatus comprising a suspension means and a heating vessel capable of holding a heating liquid at the required temperature. The suspension means and the vessel are in communication with one another by one or more means for delivering the suspension from the suspension means to the heating vessel. There are also provided means for removing the resulting catalyst bodies formed in the liquid from the heating vessel and means for subsequently separating said catalyst bodies from the liquid.

The suspension can be introduced into the heating liquid as preshaped masses thereof or it can be formed into bodies in situ while in direct contact with the heating liquid. In the latter case catalyst bodies which are very regular in shape are produced.

The invention will be elucidated with reference to the accompanying drawing which is a schematic illustration of the apparatus and method of the present invention.

Referring to the drawing a wet or dry filtration residue from the catalyst preparation, water and a binder, e.g. kaolinite are fed in suitable relative proportions to a suspension means through suitable conduits 1, 2 and 3 respectively. The suspension means comprises a mixer 4 and a tank 5 provided with an agitator 6 in which tank the suspension produced in the mixer 4 is maintained. By means of a positive feedmechanism such as a worm or screw conveyor 7 the suspension is withdrawn from the tank 5, distributed through one or more conduits 8 (one of which is shown in full) and fed to the lower portion of a heating vessel 9. The suspension is delivered through lines 8 to heating vessel 9 by means of adjustable metering pumps 10, preferably diaphragm pumps or screw pumps, which deliver the suspension to nozzles 11 fitted at the delivery or outlets and of lines 8 and positioned near the bottom 12 of vessel 9. The heating vessel 9 is filled with a heating liquid, such as an oil which is not miscible with water. The oil is circulated through conduits 14, 15 and 16 by a pump 13. A heat exchanger 17 is interposed between lines 15 and 16 to heat the oil. The oil together with the formed catalyst bodies move in an upward direction through vessel 9 and are discharged therefrom via outlet 18. The catalyst bodies are then separated from the oil by passing the mixture thereof over a sievebend 19, the underside of which is in communication with line 14 through collecting tank 20 for recycle of separated oil to vessel 9.

As the suspension mover through one of the lines 8, a predetermined quantity of suspension is introduced into the oil through nozzle 11. This quantity establishes the size of the resulting catalyst body and can be controlled by periodically injecting a small quantity of a fluid which is not miscible with water through line 21 and into line 8 by periodically opening valve 22 to admit the fluid therein from a source (not shown). The small quantities of gas, such as air, a liquid, such as oil, injected into the suspension move along with the suspension through line 8 and periodically interrupt the stream of suspension flowing through nozzle 11. With the use of several nozzles 11, catalyst bodies are thus formed in the hot oil from these small quantities of suspension, again; the size of the catalyst bodies being varied by controlling the periodic opening of valve 22 and the delivery of pump 10. By direct heat exchange between the hot oil and the small quantities of suspension, the latter are very rapidly heated and are transformed into the desired catalyst bodies exhibiting a sponge-like structure with liberation of water in vapor form. As a result, the catalyst bodies rise in the oil which movement is assisted by the upward flow of the oil. A mixture of the oil and the catalyst bodies are then removed from vessel 9 via outlet 18 and directed to the sieve bend 19 where the catalyst bodies are separated from the oil and are discharged at 23 to, for instance, a centrifuge where most of any residual oil is expelled of the pores thereof. The oil thus removed is heated and pumped back to vessel 9. To prevent clogging of nozzles 11 with dewatered suspension, it is desirable that the nozzles be cooled. To this end a cooling zone 23 is provided under the bottom 12, with conduits 24 and 25 in communication therewith for the supply and discharge of a suitable coolant such as water or the like.

The capacity of the above equipment for making formed catalytically active bodies from powders of a catalytically active material on a thermally stable carrier is extremely large compared to the capacity of pelleting machines. One advantage is that in the present process a material in dry form is not essential as an initial ingredient. Thus a moist filtration residue of the catalyst preparation can be used.

Finally, the catalyst bodies formed in the heating liquid are subjected to a thermal treatment in air at an elevated temperature in a furnace to harden the catalyst bodies. Thereafter, the catalytic material present in the bodies can be reduced, if required, at a lower temperature in accordance with conventional reduction techniques.

EXAMPLE I

Preparation of Catalytically Active Bodies with Kaolinite as the Carrier Material and Nickel as the Catalytically Active Material.

60.5 grams of $NiCl_2 \cdot 6 H_2O$ and 150 grams of urea were dissolved in 2½ liters of water. In this solution 15 grams of kaolinite were suspended, thereupon the suspension was boiled for 20 hours. The green nickel-hydroxide coated clay thus obtained was filtered and washed. The filtration proceeded smoothly.

The still moist residue was subsequently mixed with 20 percent by weight of kaolinite and sufficient water to produce an aqueous suspension having a viscosity of 150 poises. Small portions of this suspension, each with a volume of about 1 ml, were introduced into paraffin oil at a temperature of 130° C. After a very short time expanded catalyst bodies floated to the top of the oil from which they were removed after approximately 30 seconds. The catalyst bodies thus obtained were slowly heated in a tubular furnace to a temperature of 1,100° C. in the presence of a stream of air and maintained at said temperature for 1 hour. Thereafter the catalyst bodies were cooled. The resulting catalyst bodies exhibited a green color and possessed reasonable strength. They withstood a point load of 2 kg. After calcination at 1,400° C this value had increased to over 10 kg.

The reduction of the catalyst bodies was conducted in a recording thermobalance in a stream of hydrogen. Measured by the loss in weight, the reduction set in at 380° C. After the reducing temperature had been increased to 565° C. in increments of 1° C. per minute and after exposing the catalyst bodies for 2 hours at the latter temperature the degree of reduction remained constant. On raising the temperature to 780° C. the change in weight did not exceed 0.1 percent. Consequently, at 565° C. the nickel in the catalyst body had been virtually completely reduced. The resulting catalyst bodies exhibited a black color and were ferromagnetic. They did not show any change in firmness.

The X-ray diffraction pattern of the mass indicated the presence of (a) metallic nickel, (b) a little $\alpha$-quartz and (c) kaolinite. In an electron microscopic picture of an ultramicrotome group (thickness 30 m$\mu$) of the reduced catalyst body the lamellae of the kaolinite, measuring 60 m$\mu$ × 60 to 80 m$\mu$ could be clearly seen. Homogeneously distributed on these lamellae were nickel particles varying in size between 10 m$\mu$ and 40 m$\mu$. From this photograph it appeared that even on a submicroscopical scale the accessibility of the catalytically active nickel particles was exceptionally high.

EXAMPLE II

Preparation of Catalytically Active Bodies with Silica as the Carrier Material and Nickel as the Catalytically Active Material.

The high-porosity carriers frequently used in catalytic processes, such as silica, can also be employed with the process according to the invention. A very suitable carrier of this type is silica, sold under the trade name "AEROSIL".

56.5 grams of $NiCl_2 \cdot 6 H_2O$ and 140 grams of urea were dissolved in 2½ liters of water. 7 grams of "AEROSIL 200 V" (specific surface area 200 sq.m. per gram) were suspended in this solution. The resulting suspension was boiled for 18 hours. The loaded AEROSIL was subsequently filtered and washed. The filtration proceeded smoothly.

The still moist filter residue was mixed with 25 percent by weight of kaolinite and sufficient water to produce a suspension having a viscosity of 100 poises. Small portions of this suspension, each with a volume of about 1 ml, were introduced into paraffin oil at a temperature of 130° C. After a very short time expanded catalyst bodies floated to the top of the oil, from where they were removed after about 30 seconds. The catalyst bodies were slowly heated to a temperature of 1,200° C. in a stream of air, in a tubular furnace, and kept at said temperature for 1 hour. Upon cooling to 600° C. and on replacement of the air by nitrogen, hydrogen was fed through the furnace for 40 hours. The catalyst bodies thus obtained had a black color and were ferromagnetic. They could easily withstand a point load of 3 kg.

EXAMPLE III

Pulverulent $Al_2O_3$, mixed with 10 percent by weight of pure kaolinite, Seger cone 35/36 (softening point between 1,780° and 1,805 C.) was suspended in water, the viscosity of the resulting suspension being 300 poises. Thereafter, droplets of the suspension were introduced into waste oil at a temperature of 130° C. After a very short time, expanded catalyst bodies were floated to the surface of the oil, from which they were removed after approximately 30 seconds. After most of the oil had been removed from the catalyst bodies in a centrifuge, the catalyst bodies were heated in a furnace at 1,100° C. for 1 hour. The resulting, hard, sponge-like catalyst bodies had a volume weight of 0.68 g/cc and were of a practically white color. The bodies were also heated to 1,400° C for 2 hours, after which the volume weight was found to be 0.82 g/cc.

EXAMPLE IV

The procedures described in example II were repeated, but non-loaded AEROSIL and 25 percent by weight of kaolinite were employed. These materials were suspended in water containing 20 g of $NiCl_2 \cdot 6 H_2O$ per liter, the viscosity of the suspension being 100 poises. The catalyst bodies produced from this suspension had a volume weight of 0.7 g/cc and the macropore system in them was so well developed that they immediately sank in water. The nickel could be reduced without any difficulties.

What is claimed is:

1. A process for producing macroporous bodies suitable for use as catalyst carriers from thermally stable carrier material in particulate form, said carrier material being selected from the group consisting of clay and of oxides of silicon and aluminum, and mixtures thereof, consisting essentially of
   1. forming a suspension of said particulate carrier material in water,
   2. introducing small volumes of said suspension ranging between 0.1 – 10 ml into a heating liquid immiscible with water, said heating liquid being at a temperature above the boiling point of water at operating pressure, whereby coherence between the carrier material particles is retained and whereby said water essentially evaporates thereby forming macropores in the resulting bodies,
   3. separating said macroporous bodies from said heating liquid, and
   4. heating said macroporous bodies to a temperature of at least 600° C.

2. The process of claim 1 wherein said aqueous suspension in step 1 also includes a water-soluble salt of a catalytic active material selected from the group consisting of bismuth, chromium, cobalt, copper, iron, molybdenum, nickel, palladium, platinum, silver and tin in amounts effective to provide about 25 weight percent catalytic active material in the resulting macroporous bodies based on the total weight of said macroporous bodies.

3. The process of claim 1 wherein said immiscible heating liquid is a hydrocarbon having a boiling point greater than 100° C.

* * * * *